(12) United States Patent
Bowden

(10) Patent No.: US 6,264,221 B1
(45) Date of Patent: Jul. 24, 2001

(54) BASE STRUCTURE FOR A MOBILE ACCESS PLATFORM

(76) Inventor: Frank Roger Bowden, Manor Farm, Castle Hill Road, Tottenhoe, Bedfordshire, LU6 2BY (GB)

( * ) Notice: Subject to any disclaimer, the term of this patent is extended or adjusted under 35 U.S.C. 154(b) by 0 days.

(21) Appl. No.: 09/241,002

(22) Filed: Feb. 1, 1999

(30) Foreign Application Priority Data

Feb. 10, 1998 (GB) .................................................. 9802718

(51) Int. Cl.7 ............................. B60G 3/06; B60G 11/14; B60G 17/02
(52) U.S. Cl. ........................ 280/124.102; 280/124.111; 280/124.134; 280/124.179; 267/255
(58) Field of Search .................................... 280/104, 788, 280/124.102, 124.11, 124.111, 124.112, 124.113, 124.134, 124.145, 124.179, 124.136; 267/248, 255

(56) References Cited

U.S. PATENT DOCUMENTS

| | | | |
|---|---|---|---|
| 1,064,613 | * 6/1913 | Coggin | 280/124.111 |
| 1,402,890 | * 1/1922 | Reed | 267/255 |
| 1,507,009 | * 9/1924 | Strietmann | 280/124.179 |
| 2,531,933 | * 11/1950 | Clark | 280/124.179 |
| 2,744,761 | * 5/1956 | Steele | 280/124.179 |
| 2,840,386 | * 6/1958 | McFarland et al. | 280/124.136 |
| 3,767,223 | * 10/1973 | Bottenberg | 280/788 |
| 3,770,290 | * 11/1973 | Bottalico | 267/248 |

FOREIGN PATENT DOCUMENTS

| | | |
|---|---|---|
| 0 662 446 A1 | 7/1995 | (EP) . |
| 2 292 929 | 3/1996 | (GB) . |
| WO 97/07009 | 2/1997 | (WO) . |

* cited by examiner

*Primary Examiner*—Peter C. English
(74) *Attorney, Agent, or Firm*—Merchant & Gould P.C.

(57) ABSTRACT

A base structure for a mobile access platform includes a chassis (10) having at least two pairs of wheels (12, 16a, 16b), at least a first one of the pairs of wheels (16a, 16b) including a suspension mechanism including, for each wheel, a swing arm member (18) on which the wheel is mounted, the swing arm member (18) being arranged to pivot about a substantially horizontal pivot axis, a stop member (21) arranged to engage the swing arm member (18) so as to limit upwards movement thereof, and a biassing mechanism (24) arranged to exert a biassing force on the swing arm member (18) to urge the swing arm member upwards towards the stop member (21). The biassing force is less than the force needed to maintain the swing arm member (18) in engagement with the stop member (21) when the wheel is unsupported. The arrangement is such that the swing arm members (18) normally engage the stop members (21) when the mobile access platform is standing on flat, level ground.

7 Claims, 3 Drawing Sheets

BASE STRUCTURE FOR A MOBILE ACCESS PLATFORM

BACKGROUND OF THE INVENTION

The present invention relates to a base structure for a mobile access platform.

Access platforms generally have a cage for an operator that is mounted on the end of a hydraulically-operated boom. The boom is mounted on a base structure and can be moved up and down or from side-to-side under the control of an operator in the cage.

There are two main types of access platform. The first of these is mounted on a trailer and has stabiliser legs that may be brought into engagement with the ground to stabilise the platform. This type of platform cannot be moved during use.

The second type of access platform is provided with wheels and is fully mobile. It does not have stabiliser legs and is stabilised solely by the weight of the base unit and the counter-weight attached to the boom. This type of platform is normally self-propelled and may be driven from the cage even whilst the boom is raised. The present invention relates to mobile access platforms of this general type, in which the base unit does not have stabiliser legs.

In mobile access platforms, the wheels are normally mounted on rigid axles without any form of suspension and the tyres are very hard. This is essential to ensure that the base unit does not tilt when the boom is extended to one side of the base and to provide the necessary stability. The base unit must also be very heavy, and the wheels and tyres normally provide a significant part of the weight of the base.

One disadvantage of providing a completely rigid chassis with no suspension is that when the mobile access platform is standing on a slightly uneven surface, one of the wheels may be raised slightly off the ground. Whilst this does not seriously affect the stability of the platform, since the weight of the lifted wheel still contributes to the overall weight of the base, it can be disconcerting for the operator. Also, if the lifted wheel is a drive wheel, drive from that wheel will be lost.

BRIEF SUMMARY OF THE INVENTION

It is an object of the present invention to provide a base structure for a mobile access platform that mitigates at least one of the afore-mentioned disadvantages.

According to the present invention there is provided a base structure for a mobile access platform, the base structure including a chassis having at least two pairs of wheels, at least a first one of said pairs of wheels including a suspension mechanism including, for each wheel, a swing arm member on which the wheel is mounted, said swing arm member being arranged to pivot about a substantially horizontal pivot axis, a stop member arranged to engage the swing arm member so as to limit upwards movement thereof, and biassing means arranged exert a biassing force on the swing arm member to urge the swing arm member upwards towards the stop member, the biassing force being less than the force needed to maintain the swing arm member in engagement with the stop member when the wheel is unsupported, the arrangement being such that the swing arm members normally engage the stop members when the mobile access platform is standing on flat, level ground.

Because the swing arms cannot move upwards from their normal position, the platform cannot tilt significantly, this being essential for its stability. The swing arms can however drop down below their normal positions in engagement with the stop members, and all four wheels thus maintain contact with the ground even when the platform is standing on ground that is not completely flat. This improves the confidence of the operator and maintains drive from both of the drive wheels. However, as the swing arm is biassed upwards towards the stop member, the weight of that arm and wheel still contributes to the overall weight of the base structure and therefore to the stability of the platform. The stability is not therefore compromised.

Advantageously, said biassing means is arranged to exert a biassing force on the swing arm member that is greater than 80%, and preferably 90%, of the force needed to maintain the swing arm member in engagement with the stop member when the wheel is unsupported. For example, the swing arm and wheel may typically weigh approximately 200 kg and the biassing member (for example a spring or hydraulic actuator) may be arranged to exert a force on the swing arm that is sufficient to support a weight of approximately 180 kg. Therefore, when the platform is standing on uneven ground and one of the wheels drops down out of engagement with the stop member to rest against the ground, the force exerted by that wheel on the ground is only approximately 20 kg and the remaining 180 kg still contributes to the overall weight of the base.

Said first pair of wheels advantageously comprises the driven wheels of the mobile access platform, which may be the rear wheels of the mobile access platform. The front, steerable wheels may be mounted on a rigid axle.

The base structure may include means for controlling the biassing force exerted on the swing arms, and said means for controlling the biassing force may include an actuator means that is arranged to reduce, when actuated, the biassing force exerted on the swing arms. Thus, when the platform tips and one of the wheels drops down out of engagement with the stop member to rest against the ground, the force exerted by that wheel on the ground may be increased, so improving the drive from that wheel. The actuator may be controlled automatically to prevent actuation when the boom is raised, thereby ensuring the stability of the platform.

Embodiments of the present invention will now be described, by way of example, with reference to the accompanying drawings, in which:

DETAILED DESCRIPTION OF THE INVENTION

Figure 1A:
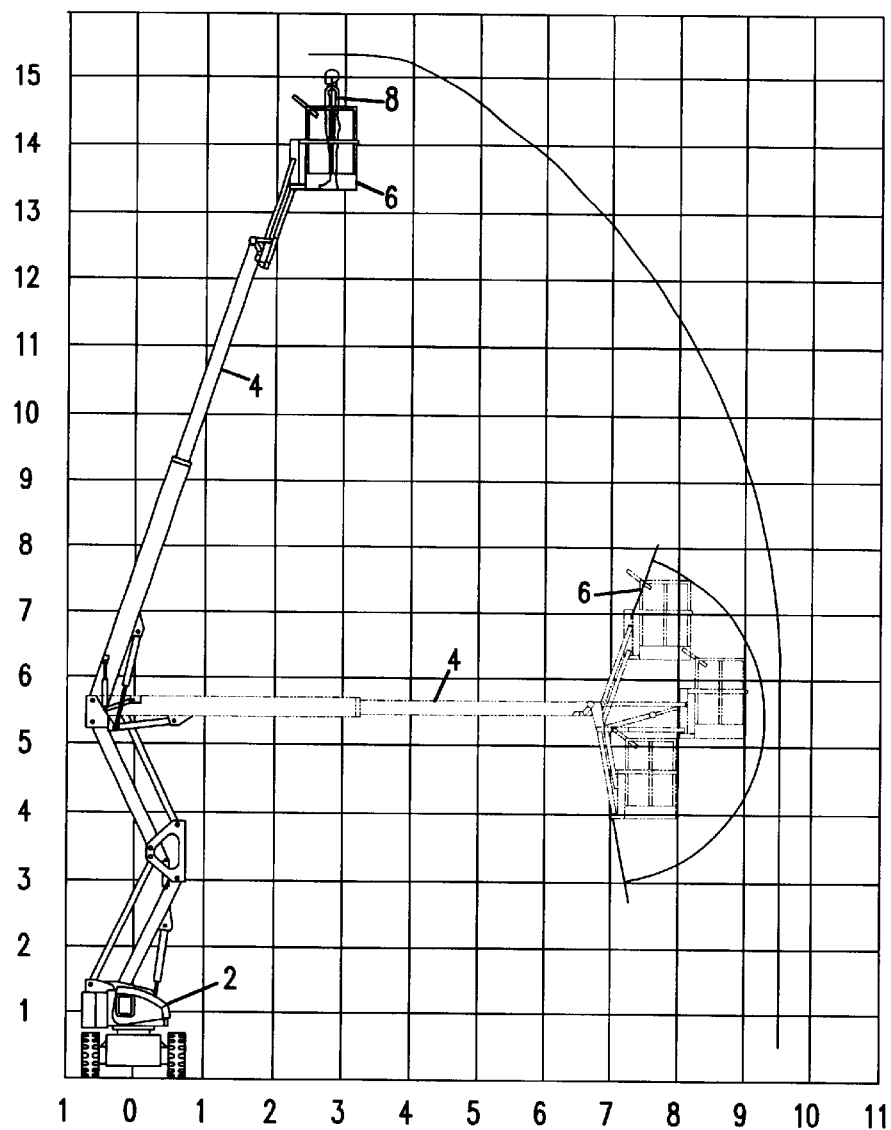
FIG. 1a is a front view of a mobile access platform showing the boom in two different raised positions.
Figure 1B:
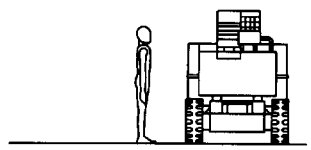
FIGS. 1b and 1c are rear and side views of the platform with the boom lowered.
Figure 1C:
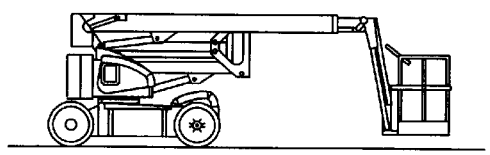

The main components of the mobile access platform are shown in FIGS. 1a to 1c and consist of a base unit 2, a hydraulically-operated boom 4 that is mounted on the base unit 2 and a cage 6 mounted on the end of the boom 4 for an operator 8. The boom 4 and the cage 6 are entirely conventional and will not be described in detail.

Figure 2:
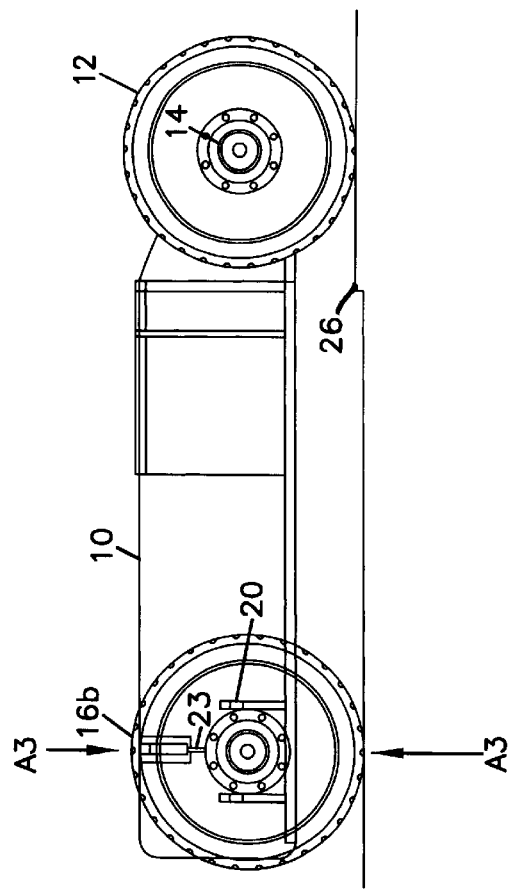
FIG. 2 is a side view of the chassis and wheels of the base unit.
Figure 3:
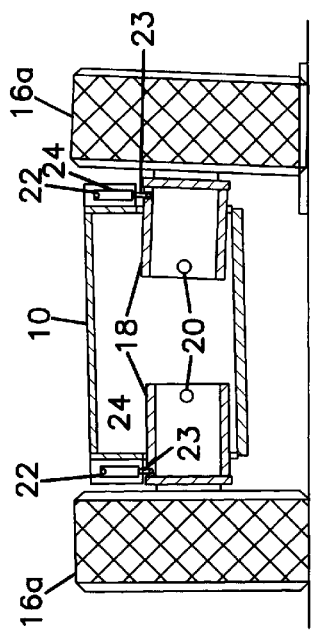
FIG. 3 is a cross-section through FIG. 2 on the line 3—3.
Figure 4:
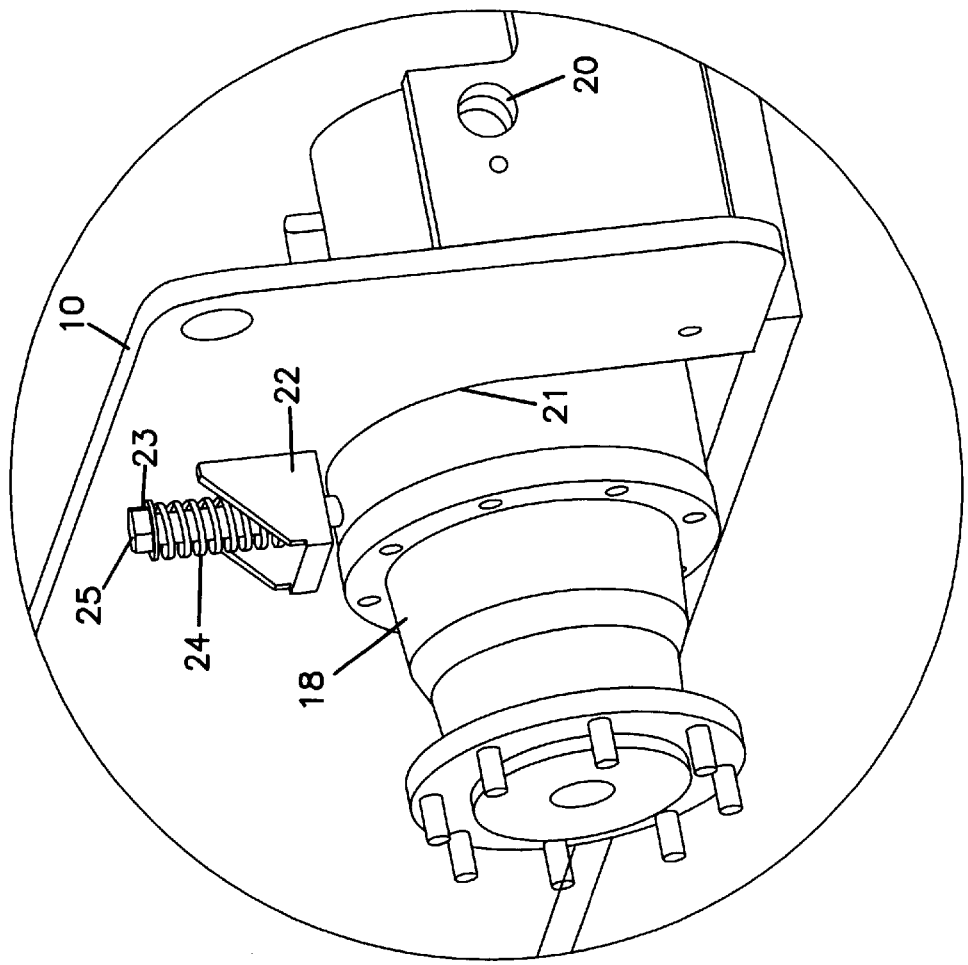
FIG. 4 is a view of a part of the chassis and one of the swing arms on an enlarged scale.

The base unit 2 includes a chassis 10, which is shown in more detail in FIGS. 2 to 4. The chassis has a pair of steerable wheels 12 that are mounted in conventional manner on a fixed axle 14 at the front end of the chassis 10 and a pair of driven wheels 16a, 16b that are mounted at the rear of the chassis.

The rear wheels 16a, 16b are mounted on swing arms 18 that can pivot vertically about horizontal pivot pins 20 that extend parallel to the longitudinal axis of the chassis 10. The swing arms 18 contain the drive motors for the wheels and extend outwards through ∩-shaped openings 21 in the sides of the chassis 10. The upper edges of the openings 21 engage the upper surfaces of the swing arms 18 and serve as stop members to restrict upwards movement of the arms. When the base unit is standing on flat ground, both swing arms 18 engage the upper edges of the openings 21 and cannot move upwards from that position, which prevents the platform from tilting.

As shown in more detail in FIG. 4, each swing arm 18 is connected to a bracket 22 mounted on the side of the chassis 10 by means of a tensioning bolt 23 and a compression spring 24 (alternatively, a spring damper may be used). The tensioning bolt 23 is attached to the upper part of the swing arm 18 and extends upwards along the axis of the spring 24. The spring 24 is held in compression between the head 25 of the tensioning bolt 23 and the base of the bracket 22, so that it exerts an upwards force on the swing arm through the tensioning bolt 23. The swing arm 18 is therefore urged upwards towards the upper edges of the openings 21.

The upwards force exerted by the spring 24 on the swing arm 18 is adjusted by rotating the bolt 23 to be only slightly less than the force needed to support the weight of the wheel and the swing arm. Therefore, when the platform is standing on uneven ground, for example with one front wheel 12 standing on a raised obstacle 26 (as shown in FIGS. 2 and 3), the unsupported wheel 16b and the swing arm 18 drops down until the wheel 16b rests lightly against the ground. Both drive wheels 16a, 16b are therefore able to drive the platform and, because all four wheels remain in contact with the ground at all times, the confidence of the operator is improved.

Because the force exerted by the spring 24 on the wheel 16b is only slightly less than the force needed to lift that wheel (for example, the effective weight of the wheel and the swing arm minus 20kg), the wheel still contributes significantly to the overall weight of the base unit. The stability of the platform is not therefore compromised.

Optionally, the spring 24 may be replaced by a hydraulic actuator that, when actuated, reduces the upwards force exerted on the swing arm and the wheel. The unsupported wheel will then press more heavily on the ground when the platform is standing on uneven ground, which will increase the drive from that wheel. This may be helpful when, for example, driving the platform to the work site over loose or slippery ground or over inclines.

Because the contribution made by the weight of the wheel to the stability of the platform will be reduced when the actuator is actuated, an automatic controller may be provided to prevent actuation when the boom is raised. It will be noted that this mechanism is fail-safe, since if the actuator should fail, the force applied to the swing arm will revert to its maximum value, thereby ensuring the stability of the platform.

The base structure may also be useful for other vehicles where a very high degree of stability is required.

What is claimed is:

1. A base structure for a mobile access platform, the base structure including a chassis having at least two pairs of wheels, at least a first one of said pairs of wheels including a suspension mechanism including, for each wheel, a swing arm member on which the wheel is mounted, said swing arm member being arranged to pivot about a substantially horizontal pivot axis, a stop member arranged to engage the swing arm member so as to prevent upwards movement thereof, and biasing means arranged to exert a biasing force on the swing arm member to urge the swing arm member upwards towards the stop member, the biasing force being less than a force needed to maintain the swing arm member in engagement with the stop member when the wheel is unsupported, the arrangement being such that the swing arm members normally engage the stop members when the mobile access platform is standing on flat, level ground.

2. A base structure according to claim 1, in which for each wheel said biasing means is arranged to exert a biasing force on the swing arm member that is greater than 80% of the force needed to maintain the swing arm member in engagement with the stop member when the wheel is unsupported.

3. A base structure according to claim 1, in which said first pair of wheels comprises driven wheels of the mobile access platform.

4. A base structure according to claim 1, in which said first pair of wheels comprises rear wheels of the mobile access platform.

5. A base structure according to claim 1, including means for adjusting the biassing force exerted on the swing arms.

6. A base structure according to claim 5, wherein said means for adjusting the biassing force includes a tensioning bolt.

7. A base structure according to claim 1, in which for each wheel said biassing means is arranged to exert a biassing force on the swing arm member that is greater than 90% of the force needed to maintain the swing arm member in engagement with the stop member when the wheel is unsupported.

* * * * *